Figure 3:
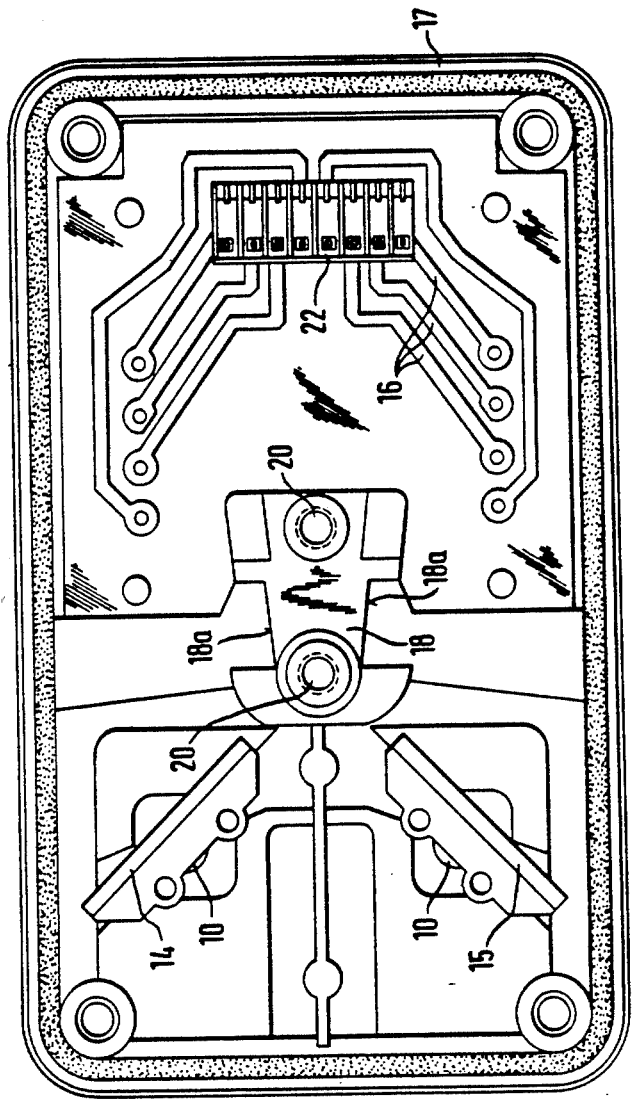

United States Patent [19]

Anselment et al.

[11] Patent Number: 4,605,850
[45] Date of Patent: Aug. 12, 1986

[54] LIGHT BARRIER APPARATUS FOR MONITORING DOORWAYS

[75] Inventors: Christoph Anselment; Karl H. Sackmann, both of Waldkirch, Fed. Rep. of Germany

[73] Assignee: Erwin Sick GmbH Optik-Elektronik, Waldkirch, Fed. Rep. of Germany

[21] Appl. No.: 617,384

[22] Filed: Jun. 5, 1984

[30] Foreign Application Priority Data

Jun. 7, 1983 [DE] Fed. Rep. of Germany ....... 3320528

[51] Int. Cl.⁴ .............................................. G08B 13/18
[52] U.S. Cl. ..................... 250/221; 340/556; 455/605
[58] Field of Search ................ 455/606, 607, 601, 605, 455/604; 340/556, 557, 693, 555; 250/221

[56] References Cited

U.S. PATENT DOCUMENTS

| | | | |
|---|---|---|---|
| 3,740,562 | 6/1973 | Fertig | 250/221 |
| 3,743,290 | 7/1973 | Crimmins et al. | 250/221 |
| 3,752,978 | 8/1973 | Kahl, Jr. et al. | 250/221 |
| 4,097,733 | 6/1978 | Langenbach et al. | 250/221 |
| 4,412,129 | 10/1983 | Duncan | 250/221 |

*Primary Examiner*—Joseph A. Orsino, Jr.

[57] ABSTRACT

In a light barrier apparatus for monitoring doorways to the left and to the right of a central post two light transmitter/receiver devices (11, 12) are mounted together with the associated electronic circuitry on a structural element to form a first unit. This unit is releasably secured to a base member which carries two deflecting mirrors (14, 15) and the electrical connection terminals. The unit can be removed from the base member (17) at right angles to a plane which includes the optical axes (11c, 12c) of the light transmitter/receiver devices (11, 12).

11 Claims, 6 Drawing Figures

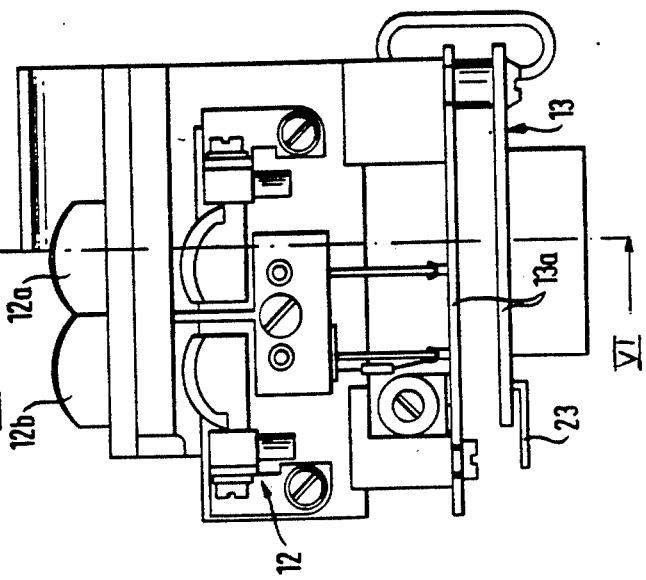
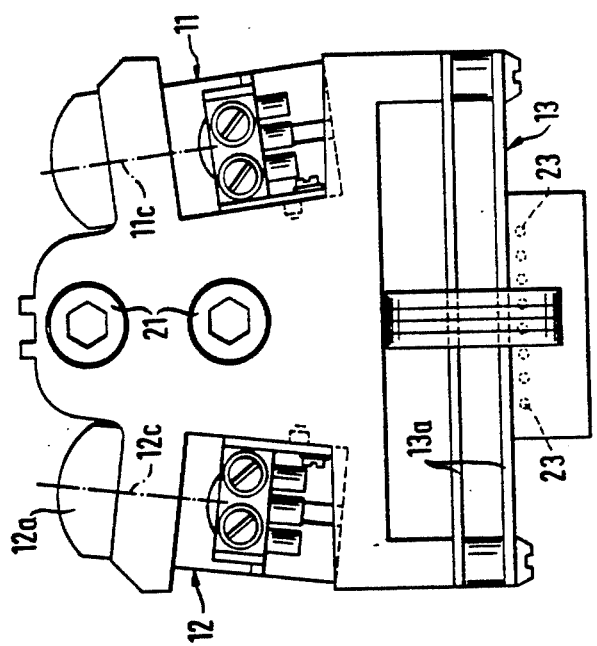

LIGHT BARRIER APPARATUS FOR MONITORING DOORWAYS

The invention relates to light barrier apparatus for monitoring doorways and has particular reference to light barrier apparatus of the kind which has two light transmitter/receivers mounted within a housing which is generally attached to the central post of a doorway of a public transport vehicle and which transmits beams of light through the two halves of the doorway on either side of the central post to two retroreflectors arranged at the edges of the doorway. A light barrier arrangement of this kind is known from U.S. Pat. No. 4,097,733.

In this known arrangement the two light transmitter/receiver devices are arranged with their optical axes substantially vertical and direct respective beams of light to respective deflecting mirrors which deflect the beams of light from a generally vertical direction into a generally horizontal direction. The beams of light leave the apparatus through respective windows at the sides of the housing and re-enter the apparatus through these windows after reflection at the retroreflector. The deflecting mirrors are mounted on universal joints so that they may be ideally aligned with the retroreflectors.

If a defect occurs in the known light barrier apparatus then it is generally necessary to interchange the entire light barrier including the optical system and the housing. Moreover, the housing has to be opened during assembly and inept handling can lead to damage to the sensitive elements provided in the inner chamber of the housing.

The principal object of the present invention is thus to provide light barrier apparatus of the initially named kind in which it is no longer necessary to exchange the whole apparatus in the event of a defect, but is instead possible to re-use at least a part of the optical elements and the base member.

In order to satisfy this object there is provided, in accordance with the present invention, light barrier apparatus for monitoring doorways, the apparatus comprising a base member; a housing mountable over said base member, said housing having first and second oppositely disposed sides; first and second windows disposed in respective ones of said first and second sides, first and second light transmitter/receiver devices disposed within said housing and having respective substantially vertically directed optical axes, said optical axes being spaced apart from one another and lying in a common plane; first and second deflecting mirrors each mounted within said housing on said base member by a respective universally adjustable mounting, each of said first and second deflecting mirrors being positioned to deflect a respective substantially vertically directed beam of light from a respective one of said first and second light transmitter/receiver devices into a substantially horizontal direction and out of said housing through a respectively associated one of said first and second windows; first and second retroreflectors mountable outside of said housing, each said retroreflector being mounted, in operation, facing a respective one of said windows for reflecting the associated substantially horizontally directed beam of light emerging from that window back through that window and onto the associated one of said first and second deflecting mirrors for deflection back to the associated one of said light transmitter/receiver devices; electronic circuitry associated with said first and second transmitter/receiver devices, said electronic circuitry having a first set of electrical connection terminals; and a second set of complementary electrical connection terminals provided within said housing on said base member, said first and second sets of electrical connection terminals being connectable with each other; and wherein said first and second transmitter/receiver devices and said electronic circuitry are connected together to form a unit, said unit being releasably connectable to said base member and being removable from said base member by movement in a direction at right angles to said plane. The construction is preferably such that the base member includes a profiled pedestal extending at right angles to said common plane with the unit having an aperture with a profile the same as that of the profiled pedestal and being slidable over the pedestal.

It is also expedient if the profiled pedestal has an end face extending substantially parallel to said common plane and first and second spaced apart male and/or female dowel elements, and if said unit has a corresponding end surface within said profiled aperture, said corresponding end surface having third and fourth dowel elements complementary to said first and second dowel elements and engageable therewith when said unit is connected to said base member.

At least one threaded bore is conveniently provided in said profiled pedestal for accommodating threaded setscrew means for securing said unit to said profiled pedestal. In a preferred arrangement first and second threaded bores are provided in said profiled pedestal with said first and second threaded bores extending into said profiled pedestal substantially concentrically to said first and second dowel elements.

The profiled pedestal is itself preferably symmetrically disposed relative to said first and second deflecting mirrors between said first and second light transmitter/receiver devices and said first and second deflecting mirrors.

In order make effortless disconnection on the electrical terminals possible when removing the unit a particularly preferred embodiment is characterised in that the first and second sets of electrical connection terminals are defined by plug and socket connectors with said plugs extending at right angles to said common plane. In this way removal or placement of the unit on the base member results in automatic disengagement or engagement of the plugs in the sockets.

In a further advantageous development of the invention a socket strip is provided on said base member spaced from said profiled pedestal and a row of plugs are provided at a complementary position on said unit.

As a result of this construction the complete operating part, consisting of the light transmitter/receiver devices and the electronics, can be easily exchanged simply by opening the housing and releasing the securing screw or screws which fasten the unit to the base member. As a result of the arrangement of the unit on the profiled pedestal and the accurate locating dowels the adjustment of the light transmitter/receiver devices relative to the deflecting mirrors, which is set before the apparatus leaves the manufacturer's works, is always guaranteed even on exchanging one functional unit for another. The fitter does not have to re-adjust the positions of the deflecting mirrors via their universal mounts so that the correct alignment of the beams of light relative to the deflecting mirrors, and in turn relative to the retroreflectors, is permanently maintained even on replacement of the functional unit.

In order to avoid damage of the sensitive internal parts a further embodiment provides for the electrical connection terminals to the arranged outside of the inner chamber of the apparatus in the region where the apparatus is mounted to the rail.

Specifically, the base member and the housing define an inner chamber containing said first and second sets of electrical connection terminals and a further set of terminals permanently connected to said second of electrical connection terminals is provided at a location accessible from the outside of the apparatus without having to first remove the housing. In a particularly convenient arrangement the base member has a recess outside of said housing from mounting said base member to the bar and the further connection terminals are accessible through said recess. Accurate alignment of the first and second sets of terminals during placement and removal of the unit on the base member is guaranteed by the complementary profiled shapes of the pedestal on the base member and of the aperture in the structural element of the unit. The arrangement is preferably such that the profiled pedestal has two lateral grooves and the profiled aperture has two corresponding lateral projections or ribs which engage in said lateral grooves.

The electronic circuitry is conveniently mounted on at least one circuit board which extends substantially normal to said common plane and to a plane of symmetry between said first and second transmitter/receiver devices.

Because of the provision of the further terminals outside of the inner chamber the fitter can mount the apparatus without releasing the housing from the base member so that damage of the sensitive internal parts during fitting is effectively avoided.

The light transmitter/receivers preferably make use of red light emitting diodes as light transmitters rather than lamps. These diodes have a considerably higher life than an incandescent lamp.

Moreover, the apparatus should preferably have two relay outputs for separate right and left hand door control. Furthermore, the apparatus is expediently provided with two indicator diodes which facilitate the adjustment of the apparatus and of the mirrors relative to the retroreflectors at the edges of the doorway.

Figure 4:
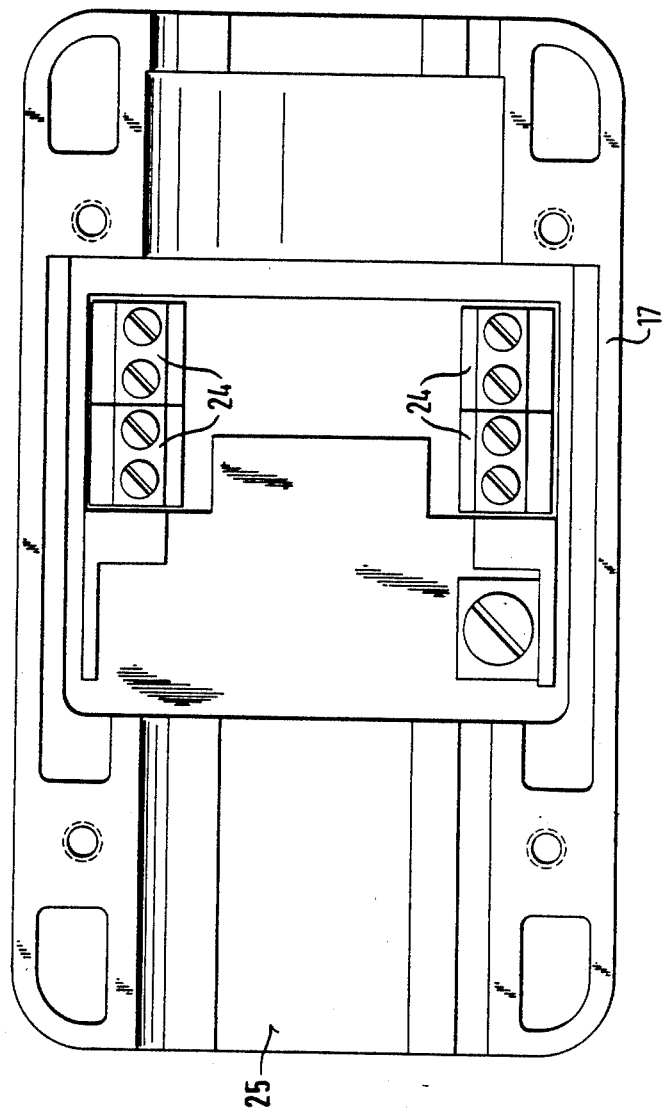
Figure 5:
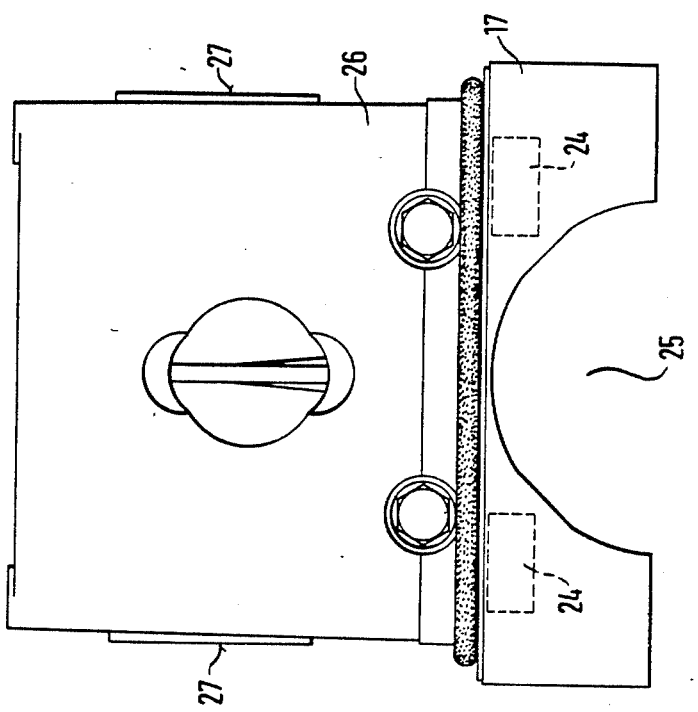
Figure 6:
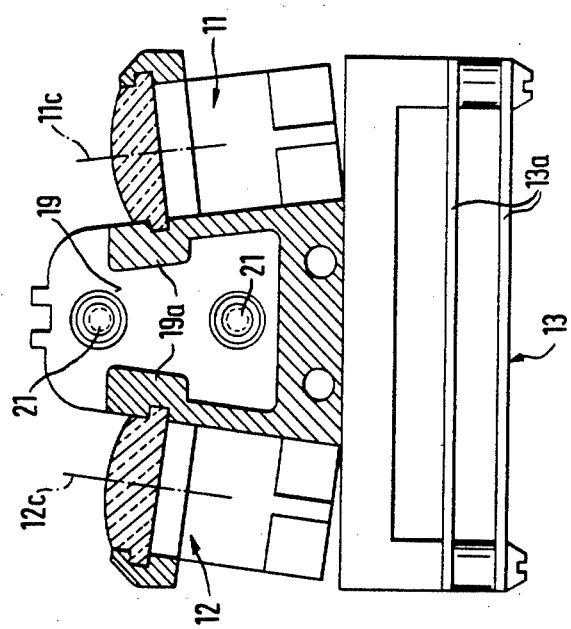

The invention will now be described in the following by way of example and with reference to the drawings which show:

FIG. 1—an end view of a unit containing first and second light transmitter receivers and the associated electronic circuitry, FIG. 2—a side view of the subject of FIG. 1, FIG. 3—an end view corresponding to the view of FIG. 1 but of a base member to which the unit of FIGS. 1 and 2 can be mounted, FIG. 4—the rear view of the base member of FIG. 3, FIG. 5—an end view on the narrow side of the base member of FIGS. 3 and 4, and FIG. 6—a simplified section along line VI—VI of FIG. 2 in order to illustrate the profiled aperture or recess of the unit of FIGS. 1 and 2.

As seen in FIGS. 1 and 2 a unit mounted on a cast part has first and second light transmitter/receiver devices 11, 12 which are arranged alongside one another. Each light transmitter/receiver comprises a light transmitting part and a light receiving part with these two parts being arranged alongside one another. In FIG. 2 the light transmitting part 12a and the light receiving part 12b of the light transmitter/receiver device 12 are schematically reproduced. The optical axes 11c and 12c of the light transmitter/receiver devices 11, 12 are disposed substantially vertically, but are however inclined to one another in a shallow V-shaped configuration.

The electronic circuitry 13, which is only schematically illustrated, is located on circuit boards beneath the light transmitter/receiver devices 11, 12. A row of plugs 23 having numerous plugs or pins extends away from the side of one of the circuit boards. The circuit boards and the first and second light receiver/transmitter devices are mounted on a dye-cast support element indicated generally by the reference numeral 34.

As can be seen from FIG. 6 a profiled recess or aperture 19 is provided in said support element 34. The recess extends, in the mounted position of the light barrier apparatus substantially horizontally and at right angles to a plane containing the optical axes 11c and 12c. Socket head setscrews 21, the heads of which can be seen in FIG. 1, extend through respective holes 28 in the support element 34 into the recess 19. The recess 19 sits over a profiled pedestal provided on a base member 18. The base member 18 is shown in FIG. 3. The profiled pedestal 18 is located substantially at the center of the base member and projects upwardly out of the plane of the drawing of FIG. 3 at right angles to the plane formed by the two optical axes 11c, 12c. Two threaded bores 20 are provided in said profiled pedestal for accommodating the two setscrews 21.

The profile of the profiled pedestal 18 is matched to the profiled recess 19 (FIG. 6) of the unit of FIGS. 1, 2 and 6 so that the unit is well-guided relative to the base member as it is engaged over the profiled pedestal. The actual fitted seat between the support element and the profiled pedestal of the base member is provided by an arrangement of dowel elements. This arrangement comprises first and second dowel cylinders 29, 30 which project upwardly from the end face of the profiled pedestal 18. The first and second dowel elements 29 and 30 engage into third and fourth dowel elements in the form of cylindrical recesses 31, 32 which are concentrically formed in the end wall of the profiled recess 19 concentric to the bores 28. It would of course be possible to have other dowel arrangements, for example the dowel cylinders could project from the structural element 34 into the profiled recess 19 and could engage in cylindrical dowel recesses in the end face of the profiled pedestal 18. Alternatively, one dowel cylinder could be provided on the profiled pedestal 18 and the other on the end wall of the profiled recess 19.

Rough alignment of the dowel elements is provided by the inwardly projecting ribs 19a of the profiled recess 19 of the structural element 34 which engage in corresponding grooves 18a in the side walls of the profiled pedestal.

A socket strip 22 is provided on the base body at the right hand side as seen in the drawing of FIG. 3. The socket strip 22 is located opposite the row of plugs 23 of the unit of FIGS. 1, 2 and 6. This socket strip, which defines second electrical connection terminals which can engage with the first set of electrical connection terminals defined by the row of plugs, is connected with further connection terminals via printed circuit lines 16 provided on a circuit board 33 secured to the base member of FIG. 3. These further connection terminals are in fact located on the reverse side of the base member of FIG. 3 as shown in FIG. 6 and are accessible from within the semi-circular passage 25, which enables the base member to be secured to a vertically disposed round bar (by the use of a cooperating semi-circularly curved cap which can be screwed to the base member).

Whereas the socket strip 22 is located in the lower region of the base member 17 the upper region of the base member 17 carries first and second deflecting mirrors 14, 15 which are secured to the base member 17 via universal joints 10 in such a way that they can be pivoted in all directions.

Any position to which the mirrors 14 and 15 are tilted can then be subsequently secured. The profiled pedestal 18 is located between the deflecting mirrors on the one hand and the socket strip 22 on the other hand.

For assembly the unit of FIGS. 1, 2 and 6 is placed over and pushed onto the securing pedestal 18 whereupon the securing screws 21 are screwed into the threaded bores 20 until a rigid connection is produced. On tightening the screws the dowel cylinders engage with the dowel recesses in a firm but accurate manner determined by a light interference fit. Furthermore, on mounting the unit of FIGS. 1, 2 and 6 onto the base member the pins of the row of pins 23 automatically engage in the socket strip 22 which is ensured by suitable profiling of the profiled pedestal 18 and of the profiled recess 19. The fitter does not therefore need to pay any particular attention to ensure that the row of plugs 23 engage in the socket strip 22.

FIG. 5 shows the recess 25 which facilitates mounting to the hand rail of a public transport vehicle. As previously mentioned a semi-circular cap engages around the rear side of the hand rail and is secured to the base member by screws so that the apparatus can be firmly mounted on the hand rail.

FIG. 5 also shows the housing 26 which is mounted over the base member 17 after mounting of the unit. The housing 26 has first and second side windows 27, which are merely schematically illustrated in FIG. 5, which permit the light beams to emerge from and re-enter the apparatus. In accordance with the invention the external electrical connection terminals 24 of the light barrier apparatus are arranged in a recess 25 of the surface of the base member 17 which faces the hand rail, and indeed in the dead region between the two rounded portions provided for mounting on the hand rail. The fitter can thus connect up the light barrier without having to remove the housing 26.

An approximately circular opening with inclined entry surfaces at the top and bottom ends is illustrated in FIG. 5 in the center of the housing endwall. This opening serves to accommodate a hygroscopic element. Through the opening it is also possible to see the vertical web which separates the two optical systems from one another in the region between the first and second deflecting mirrors 14, 15. This web can also be seen in plan view in FIG. 3. As seen in FIG. 3 the web has two cylindrical thickened regions which are spaced apart from one another.

The central web has an approximately rectangular cut out at about the level of the circular opening and adjoining this opening which can be seen in FIG. 5, so that the hygroscopic element is effective in keeping the two optical systems free of moisture.

We claim:

1. Light barrier apparatus for monitoring doorways, the apparatus comprising a base member; a housing mountable over said base member, said housing having first and second oppositely disposed sides; first and second windows disposed in respective ones of said first and second sides, first and second light transmitter/receiver devices disposed within said housing and having respective substantially vertically directed optical axes, said optical axes being spaced apart from one another and lying in a common plane; first and second deflecting mirrors each mounted within said housing on said base member by a respective universally adjustable mounting, each of said first and second deflecting mirrors being positioned to deflect a respective substantially vertically directed beam of light from a respective one of said first and second light transmitter/receiver devices into a substantially horizontal direction and out of said housing through a respectively associated one of said first and second windows; first and second retroreflectors mountable outside of said housing, each said retroreflector being mounted, in operation, facing a respective one of said windows for reflecting the associated substantially horizontally directed beam of light emerging from that window back through that window and onto the associated one of said first and second deflecting mirrors for deflection back to the associated one of said light transmitter/receiver devices; electronic circuitry associated with said first and second transmitter/receiver devices, said electronic circuitry having a first set of electrical connection terminals; a second set of complementary electrical connection terminals provided within said housing on said base member, said first and second sets of electrical connection terminals being connectable with each other; and a support element; wherein said first and second transmitter/receiver devices and said electronic circuitry are connected together and mounted on said support element to form a unit, said unit being releasably connectable to said base member and being removable from said base member by movement in a direction at right angles to said plane; and wherein said base member includes a profiled pedestal extending at right angles to said common plane, and wherein said support element of said unit has an aperture having a profile the same as that of said profiled pedestal, and being slidable over said pedestal during movement of said unit in said direction at right angles to said plane.

2. Light barrier apparatus in accordance with claim 1, wherein said profiled pedestal is symmetrically disposed relative to said first and second deflecting mirrors between said first and second light transmitter/receiver devices and said first and second deflecting mirrors.

3. Light barrier apparatus in accordance with claim 1, wherein said profiled pedestal has lateral grooves and said profiled aperture has two corresponding lateral ribs which engage in said lateral grooves.

4. Light barrier apparatus in accordance with claim 1 wherein said electronic circuitry is mounted on at least one circuit board which extends substantially normal to said common plane and to a line of symmetry between said first and second transmitter/receiver devices.

5. Light barrier apparatus in accordance with claim 1, wherein said profiled pedestal has an end face extending substantially parallel to said common plane and first and second spaced apart male and/or female dowel elements, and wherein said support element of said unit has a corresponding end surface within said profiled aperture, said corresponding surface having third and fourth dowel elements complementary to said first and second dowel elements and engagable therewith when said unit is connected to said base member.

6. Light barrier apparatus in accordance with claim 5, wherein at least one threaded bore is provided in said profiled pedestal for accommodating threaded setscrew means for securing said unit to said profiled pedestal.

7. Light barrier apparatus in accordance with claim 6, wherein first and second threaded bores are provided in said profiled pedestal, said first and second threaded bores extending into said profiled pedestal substantially concentrically to said first and second dowel elements.

8. Light barrier apparatus in accordance with claim 1, wherein said first and second sets of electrical connection terminals are defined by plug and socket connectors with said plugs extending at right angles to said common plane.

9. Light barrier apparatus in accordance with claim 8, wherein a socket strip is provided on said base member spaced from said profiled pedestal, and wherein a row of plugs are provided at a position complementary to the socket strip, on said unit.

10. Light barrier apparatus in accordance with claim 1, wherein said base member and said housing define an inner chamber containing said first and second sets of electrical connection terminals, and wherein a further set of terminals permanently connected to said second set of electrical connection terminals is provided at a location accessible from the outside of the apparatus without having to first remove said housing.

11. Light barrier apparatus in accordance with claim 10, wherein said base member has a recess outside of said housing for mounting said base member to a bar, and wherein said further connection terminals are accessible through said recess.

* * * * *